(12) United States Patent
Song (10) Patent No.: US 8,803,846 B2
(45) Date of Patent: Aug. 12, 2014

(54) METHOD FOR DETECTING TOUCH AND OPTICAL TOUCH SENSING SYSTEM

(75) Inventor: Shi-Cheol Song, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 446 days.

(21) Appl. No.: 12/969,154

(22) Filed: Dec. 15, 2010

(65) Prior Publication Data

US 2011/0148820 A1  Jun. 23, 2011

(30) Foreign Application Priority Data

Dec. 17, 2009 (KR) ........................ 10-2009-0125950
Dec. 2, 2010 (KR) ........................ 10-2010-0122017

(51) Int. Cl.
   *G06F 3/042* (2006.01)
(52) U.S. Cl.
   USPC ........................................ 345/175; 178/18.09
(58) Field of Classification Search
   USPC .......... 345/173–178; 178/18.01–18.09, 18.11
   See application file for complete search history.

(56) References Cited

U.S. PATENT DOCUMENTS

| | | | | |
|---|---|---|---|---|
| 6,480,187 B1 * | 11/2002 | Sano et al. | .................... | 345/175 |
| 7,602,380 B2 * | 10/2009 | Yoshida et al. | ............... | 345/173 |
| 2008/0068352 A1 * | 3/2008 | Worthington et al. | ........ | 345/175 |
| 2009/0207154 A1 * | 8/2009 | Chino | .......................... | 345/175 |
| 2011/0012856 A1 * | 1/2011 | Maxwell et al. | .............. | 345/173 |

FOREIGN PATENT DOCUMENTS

| | | |
|---|---|---|
| JP | 2004-199714 | 7/2004 |
| JP | 2005346230 | 12/2005 |
| KR | 1020080100008 A | 11/2008 |

OTHER PUBLICATIONS

Office Action issued in corresponding Chinese Patent Application No. 201010610426.0, mailed Nov. 28, 2012.
Office Action issued in corresponding Korean Patent Application No. 10-2010-0122017, mailed May 30, 2013, 4 pages.

* cited by examiner

*Primary Examiner* — Stephen Sherman
(74) *Attorney, Agent, or Firm* — Brinks Gilson & Lione

(57) ABSTRACT

An optical touch sensing method includes sensing light corresponding to a touch region, comparing a first amount of the light sensed corresponding to the touch region with a first lower threshold, determining that a touch is made if the first amount is less than or equal to the first lower threshold, comparing the first amount of the light sensed corresponding to the touch region with an upper threshold, and determining that a touch is made if the first amount is greater than or equal to the upper threshold.

12 Claims, 10 Drawing Sheets

METHOD FOR DETECTING TOUCH AND OPTICAL TOUCH SENSING SYSTEM

This application claims the benefit of the Korean Patent Application No. 10-2009-0125950, filed in Korea on Dec. 17, 2009 and Korean Patent Application No. 10-2010-0122-17, filed in Korea on Dec. 2, 2010, which are hereby incorporated by reference as if fully set forth herein.

BACKGROUND

1. Field of the Invention

The present disclosure relates to a method for detecting a touch, and more particularly, to a method for detecting a touch and a flat panel using the same in which both an upper threshold level and a lower threshold level are set to make more sensitive detection in a structure which uses infrared cameras positioned at least at three corners for receiving and emitting light and retro-reflecting plates for reflecting light from the infrared camera to the infrared camera again.

2. Discussion of the Related Art

In general, a touch screen is one of interface types between a user and an information and communication device which uses various kinds of displays. A touch screen is an input unit which enables the user to interact with the device as the user personally touches a screen with a hand or a pen.

The touch screen is a device which allows for a conversational and intuitive handling of the device, since it may be used by anyone by touching a button displayed on a display device with a finger. Because of these features, the touch screen is applied to many fields, such as issuing machines in banks and public agencies, various medical apparatuses, tour and major facility guidance devices and traffic guidance devices.

In the touch screen, various types are available, such as, but not limited to, a resistive type touch screen, a micro capacitive touch glass, an ultrasonic wave touch glass, an infrared type touch screen, and so on depending on methods of detection used.

The resistive type touch screen typically has two transparent conductive layers where a lower layer thereof is formed of glass or plastic coated with a conductive material and an upper layer thereof is formed of a film coated with a conductive material. The two layers are spaced by micro printed spacers and are electrically insulated. The resistive type touch screen is a device which involves a change of resistance at each of an upper plate (X-axis) and a lower plate (Y-axis) when the upper plate is touched with a hand or a touch pen in a state where a fixed voltage is applied to the two layers with the conductive material coated thereon. In this instance, a controller calculates an X (the upper plate) position and a Y (the lower plate) position by detecting changes in resistances and displays the positions on a monitor or inputs as data.

The micro capacitive touch glass has a transparent glass sensor coated with a thin conductive material. Therefore, an electrode pattern is precisely printed along a periphery of a conductive layer and a transparent vitreous protective film is placed closely on the thin conductive coating for protecting and enclosing the sensor. In the micro capacitive touch glass, a voltage is applied to a screen, and an electrode pattern forms a low voltage field on a touch sensor surface through the conductive layer. When a finger touches the screen, a micro current flows at a touch point. A current from each corner is proportional to a distance from the corner to the finger, and a touch screen controller calculates ratios of current flows to find a position at which the touch is made.

The ultrasonic wave touch glass is not affected by surface damage or wear at all in comparison to other products, which are formed of 100% vitreous material and a lifetime of the expensive touch screens instantly come to an end even by small surface damage or wear. A touch screen controller forwards a 5 MHz electric signal to a transducer to generate an ultrasonic wave, and the ultrasonic wave generated passes a surface of the touch screen by reflected rays. In the ultrasonic wave touch glass, if a user presses a surface of the touch screen, a portion of the ultrasonic wave passing through a pressed point is absorbed by the user, a signal thus lost is identified instantly by a controller through a received signal and a digital map, and based on this, coordinates of a point having a change of the signal presently are calculated. Such a series of steps are performed independently on X- and Y-axes.

The infrared type touch screen utilizes an attribute of the infrared ray in which the infrared ray cannot travel if the infrared ray comes to an obstacle since an infrared ray travels in a straight line. A portion having a pressure applied thereto cuts off the infrared rays in a transverse direction and a longitudinal direction, and X and Y coordinates of a cut off portion are read for sensing. An infrared ray light type touch screen identifies a touched position by detecting a cut off of an infrared ray scan light at a front of the touch screen. The infrared type touch screen has an infrared ray emitted from one side and received at an opposite side for both x and y axes to form a lattice of the infrared ray.

Though above types have different advantages, recently, the infrared type touch screen is drawing attention due to a minimized pressure required to be applied to the touch screen, and convenience of arrangement.

A related art infrared type touch screen will be described with reference to the attached drawings.

Figure 1:
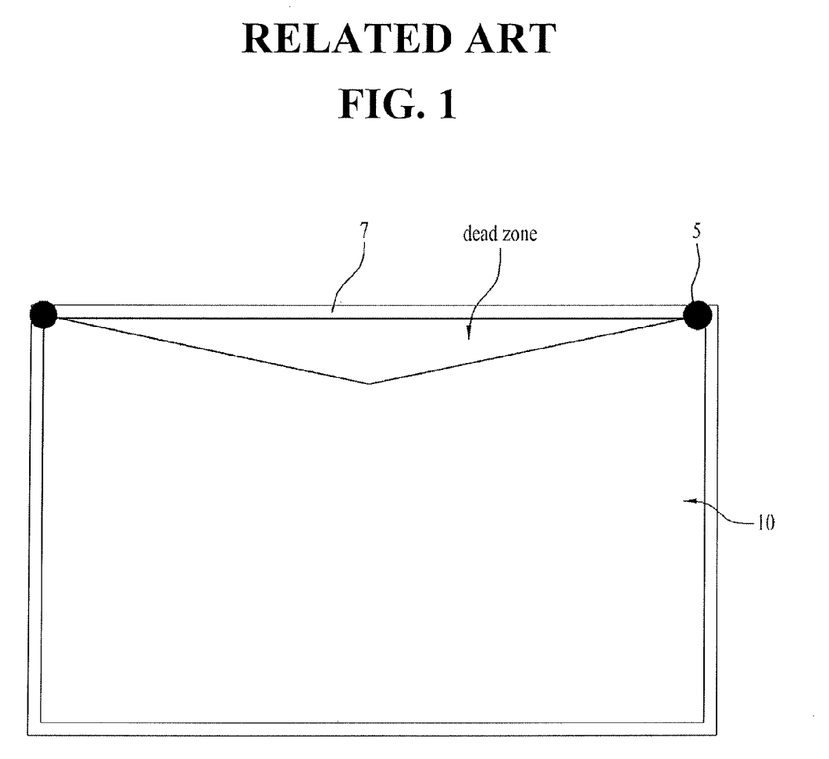
FIG. 1 illustrates a plan view showing a touch detecting method of a related art infrared type touch screen.

FIG. 1 illustrates a plan view showing a touch detecting method of a related art infrared type touch screen.

Referring to FIG. 1, the related art infrared type touch screen is provided with infrared sensors 5 mounted to adjacent two corners of the panel 10 and reflective plates 7 mounted to three sides of the panel 10.

A touch to the infrared type touch screen is detected as follows. That is, lights from infrared sensors 5 at opposite ends of the panel 10 are reflected, lights cut off at the time of the touch are sensed, and angles thereof are calculated, to perceive the touch.

However, the infrared type touch screen has a dead zone with a range greater than a certain angle between the infrared sensors 5 in which the detection is not possible, making accuracy of the touch poor at a particular region to require adjustment. In order to adjust for the dead zone, the infrared sensors are positioned outside the corners of the liquid crystal display panel to form the dead zone at an outer side of the liquid crystal panel. In this case, a touch screen greater than the liquid crystal panel is required, resulting in increase of a non-effective area which does not contribute to picture display, thereby making efficiency of the display device poor.

In general, the liquid crystal panel is separate from the touch screen. If it is intended to enable touch capabilities, additional work is required to assemble the respective components and apply coordinates to the touch screen suitable to the liquid crystal panel, and to secure the touch screen to a liquid crystal module.

In the related art touch screen, selection of accurate coordinates is difficult, and only one touch point may be perceived at a time. In other words, if two points on the touch screen are touched at the same time, the touch screen fails to perceive the touches, or perceives one of the touch points touched first, causing an error.

Figure 2:
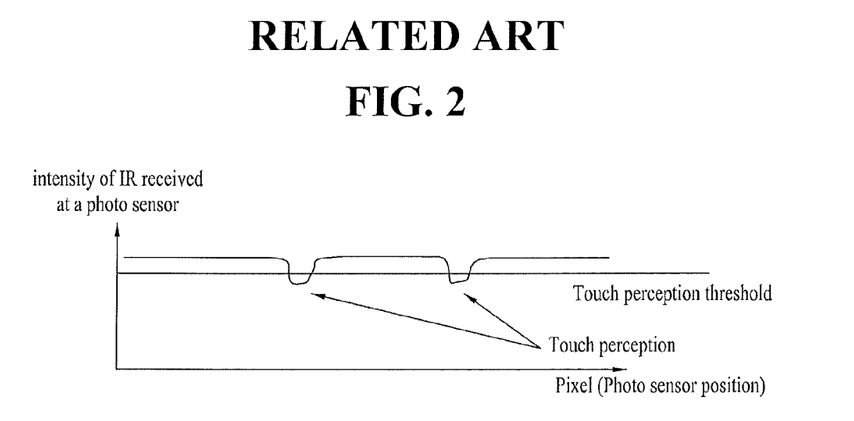
FIG. 2 illustrates a graph showing a touch detecting method in a related art touch screen.
Figure 3:
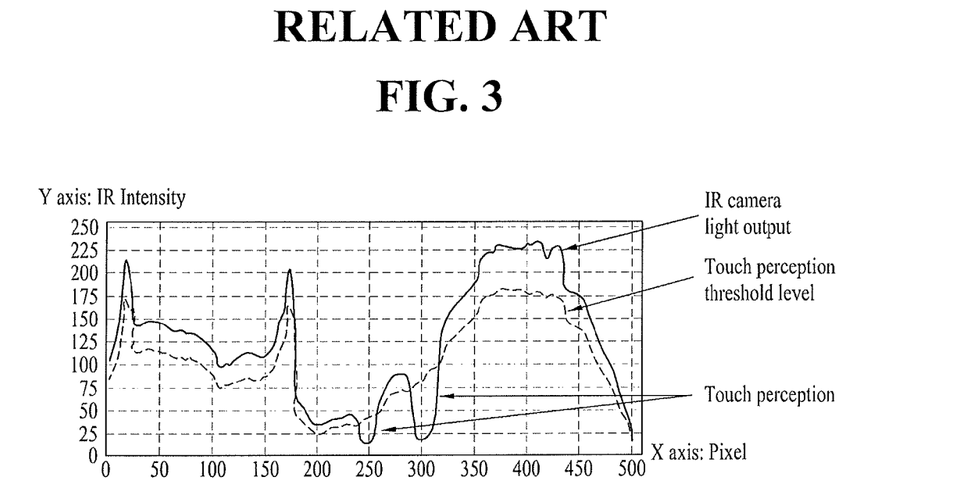
FIG. 3 illustrates a diagram of simulation in which the method of FIG. 2 is used to show light quantities and threshold levels at different pixel positions and a touch detection by using above on an actual panel.

FIG. 2 illustrates a graph showing a touch sensing method in a related art touch screen, and FIG. 3 illustrates a simulation diagram showing a light quantity, threshold level of each pixel and a touch perception according to the above on a panel by using the method of FIG. 2.

Referring to FIG. 2, in the related art touch screen, if there is a part having a light quantity reduced in sensing a light quantity of each region, it is determined that the part is touched.

That is, if the sensed light quantity is greater than a predetermined touch perception threshold level, the sensed light quantity is determined that no touch is made, and if the sensed light quantity is smaller than the predetermined touch perception threshold level, the sensed light quantity is determined that the touch is made.

FIG. 3 illustrates a graph for comparing an actual light quantity of each region sensed with an infrared camera to a touch perception level of the regions.

In actual infrared cameras, differences of quantities of lights reflected at the retro-reflecting plates and returned to the infrared cameras occurs due to differences of distances from the infrared cameras and differences of incident angles on the retro-reflecting plates, causing an intrinsic light quantity difference between regions which is not a change of the light quantity resulting from an actual touch. FIG. 3 illustrates that the touch perception threshold levels varies with regions, taking the above into account.

In this case, light quantities smaller than the touch perception threshold level are sensed at about 250 pixels and 300 pixels, and these parts are determined to be touched.

However, the related art touch sensing method has the following problems.

In the related art touch sensing method according to the above, if a touch means of a reflective material, particularly, having a highly reflective surface such as a finger nail, metal or a mirror makes a touch, a reflected light greater than the threshold level is detected, causing an incorrect determination that no touch is made.

Moreover, in the related art touch detection, a touch perception detection threshold level of each region is set to be about 80% of a quantity of the light of the case where light is emitted from the infrared camera with no touch being made at the region, reaches the retro-reflecting plate and returns to the infrared camera. However, if a particular part is touched with a thin pen or the like, a fine change light quantity caused by the touch cannot be detected if the touch is determined by the about 80% or below of the un-touched light quantity due to the fine change.

The intrinsic difference of the light quantity reflected at the retro-reflecting plate caused by arrangement of the infrared cameras and incident angles on the retro-reflecting plates regardless of the touch is also liable to cause failure in detection of a change of the fine touch at a part having a small light quantity.

BRIEF SUMMARY

Accordingly, the present disclosure is directed to a method for detecting a touch.

An object of the present disclosure is to provide a method for detecting a touch in which, in a structure which uses infrared cameras positioned at least at three corners for receiving and emitting a light and retro-reflecting plates for reflecting a light from the infrared camera to the infrared camera, both an upper threshold level and a lower threshold level are set for an improved touch detection.

An optical touch sensing method includes sensing light corresponding to a touch region, comparing a first amount of the light sensed corresponding to the touch region with a first lower threshold, determining that a touch is made if the first amount is less than or equal to the first lower threshold, comparing the first amount of the light sensed corresponding to the touch region with an upper threshold, and determining that a touch is made if the first amount is greater than or equal to the upper threshold.

An optical touch sensing system includes an optical sensor module operable to sense light corresponding to a touch region, and a control unit coupled to the optical sensor module operable to compare a first amount of the light sensed corresponding to the touch region with a first lower threshold, determine that a touch is made if the first amount is less than or equal to the first lower threshold, compare the first amount of the light sensed corresponding to the touch region with an upper threshold, and determine that a touch is made if the first amount is greater than or equal to the upper threshold.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION OF THE DRAWINGS AND THE PRESENTLY PREFERRED EMBODIMENTS

Reference will now be made in detail to the specific embodiments of the present disclosure, examples of which are illustrated in the accompanying drawings. Wherever possible, the same reference numbers will be used throughout the drawings to refer to the same or like parts.

After describing a structure to which the method for detecting a touch of the present disclosure is applied, the method for detecting a touch to be applied thereto will be described.

Figure 4:
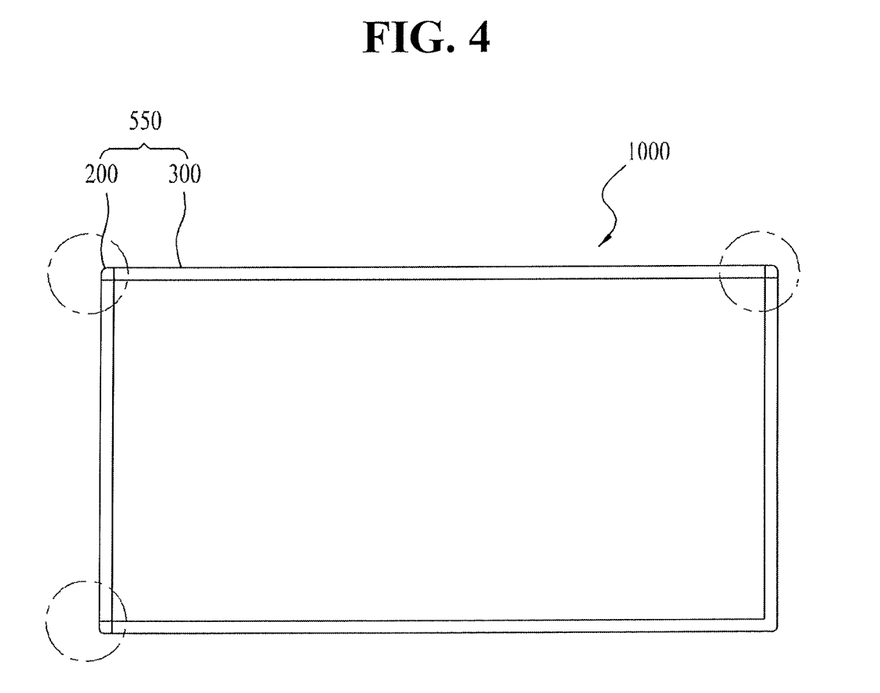
FIG. 4 illustrates a plan view of a display device with an optical sensing frame having the touch detecting method in accordance with a preferred embodiment of the present disclosure applied thereto.
Figure 5:
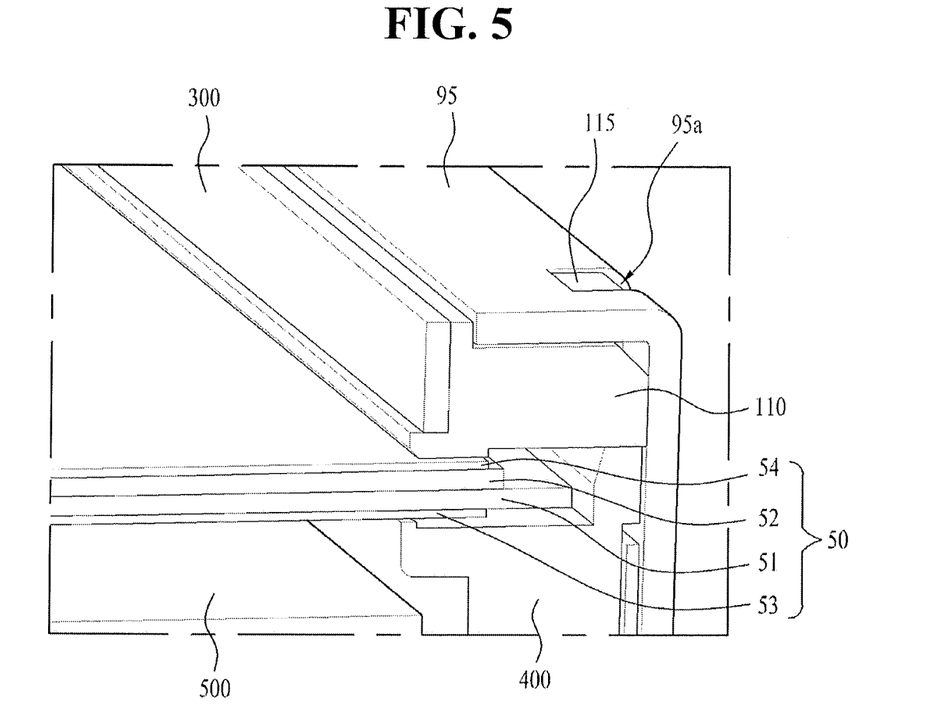
FIG. 5 illustrates a perspective view of a corner area of FIG. 4.

FIG. 4 illustrates a plan view of a display device with an optical sensing frame having a touch detecting method in accordance with a preferred embodiment of the present disclosure and FIG. 5 illustrates a perspective view of a corner area of FIG. 4.

Referring to FIG. 4, the liquid crystal display device 100 with an embedded optical sensing frame includes, on a plane, infrared camera sensor modules 200 respectively faced at three corners of a display panel 80, guide structures (not shown) provided at four sides excluding the corners having the infrared camera sensor modules 200 mounted thereto respectively, and a retro-reflecting plate 300 having a retro-reflecting layer of a plurality of rows of continuous prisms attached to a side of each of the guide structures. The infrared camera sensor modules 200, the guide structures and the retro-reflecting plates 300 are collectively called an optical sensing frame 550.

In some cases, the guide structure may be omitted in the optical sensing frame 550.

In this instance, three or more infrared camera sensor modules 200 are provided for preventing the formation of a dead zone. Touch detection is poor at a dead zone which is typically formed adjacent to one side of an optical sensing frame between two sensor modules when only two sensor modules are provided. With three or more infrared camera sensor modules 200, both a third infrared camera sensor module 200 and one of the infrared camera sensor modules 200 on the other side measure a touch point, enabling the detection of the touch at a substantial area of the dead zone of the related art.

In some case, if a particular algorithm for compensating dead zones is used, it is possible to dispose two infrared camera sensor modules at two corners of a display panel instead of three or more infrared camera sensor modules. In the Drawings, while three infrared camera sensor modules are disclosed, the number of infrared camera sensors is not limited to the Drawings.

The infrared camera sensor modules 200 and the retro-reflecting plates 300 are placed on the display panel 80. Each of the infrared camera sensor modules 200 senses light quantity (intensity) from one or more opposing different infrared camera sensor modules and the retro-reflecting plate 300. Accordingly, it is preferable that the infrared camera sensor modules 200 and the retro-reflecting plate 300 are on the same plane.

Figure 10:
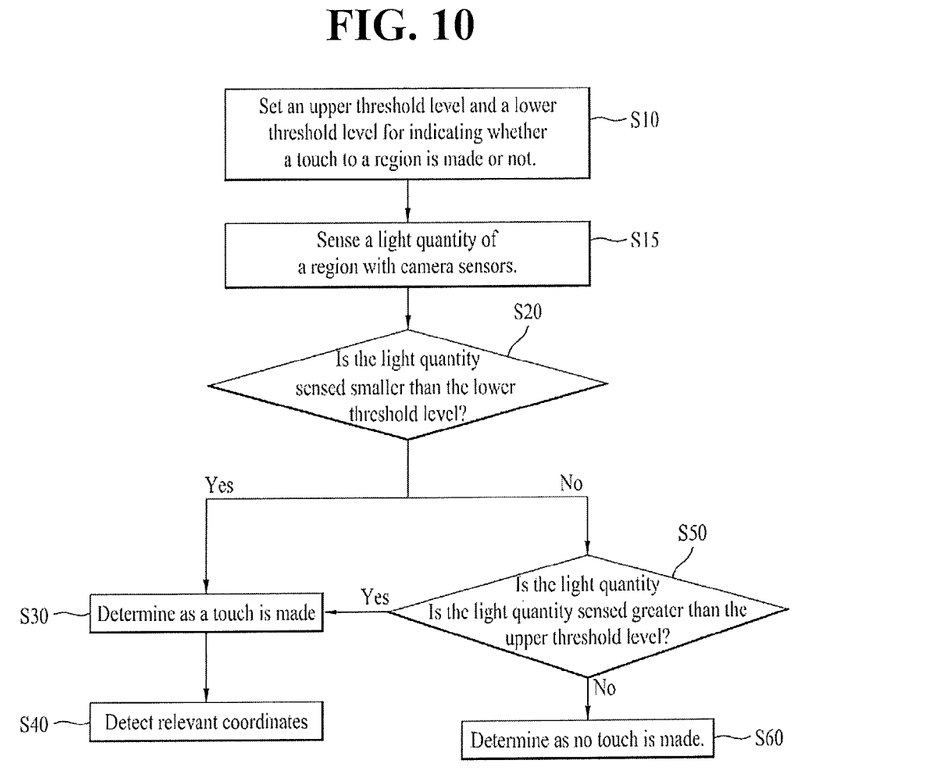
FIG. 10 illustrates a touch controller of FIG. 9.

The retro-reflecting plate 300 is attached on an inner wall of the guide structure and the guide structure is omitted at an area which the infrared camera sensor module 200 is disposed. The guide structure and the infrared camera sensor module 200 are disposed on the case top 180. In the optical sensing frame 550, the infrared camera sensor module 200 electrically couples with a touch controller 700 (as shown in FIG. 10). If the case top is not used in a display device, the optical sensing frame 550 is covered by a system cover (not shown).

The infrared sensor module 200 includes an LED to emit infrared light and a sensor to sense light reflected from the retro-reflecting plate 300 at two or more sides.

The sensor comprises a photo sensor such as a line sensor array which includes a plurality of pixels in a line. In this case, sensing area of the infrared sensor module 200 is within the two sides adjacent to the infrared sensor module 200. The one side from the infrared sensor module 200 is measured as corresponding to an angle W and the other side from the infrared sensor module 200 is measured as corresponding to an angle 90°.

If the sensor comprises 500 pixels, some pixels adjacent to 0th pixel (n pixels) and 500$^{th}$ pixel (m pixels) may be covered by the retro-reflecting plate 300 and the guide structure. Therefore, in the sensor of the infrared camera sensor module 200 may substantially sense light quantity at pixels from the (n)th pixel to the (500-m)th pixel. The pixels from (n)th pixel to (500-m)th pixel respectively correspond to the measured angles 0°~90°.

The sensed light quantities along pixels are transferred to the touch controller 700 and the touch controller detects touches as light is blocked.

The case top 180 is placed on the guide structure 110 having the retro-reflecting plate 300 attached to a side thereof, and a system cover (not shown) of plastic is formed on the outsides of the case top 180 and the guide structure 110 to encase the case top 180 and the guide structure 110. In this case, an upper portion of the system cover is extended to cover even the retro-reflecting plate 300.

Thus, in the liquid crystal display device with an embedded optical sensing frame, by providing the optical sensing frame which detects the touch fastened to the case top 180 without increasing the planar space of the display device, the touch detection is possible while maintaining a narrow bezel.

Moreover, the extension of the retro-reflecting plate to an upper side of the case top 180 enables to improve retro-reflecting efficiency. In this case, when a liquid crystal display device with the retro-reflecting plate is produced, by covering the retro-reflecting plate with the system cover (not shown), the retro-reflecting plate is made not to be exposed to an outside of the liquid crystal display device. In this case, if seen from an inside of the liquid crystal display device, the case top 180 is covered with the retro-reflecting plate 300.

Each of the infrared camera sensor modules 200 has a front facing an opposite corner in the diagonal direction the display panel.

In the meantime, a touch controller 700 which controls the infrared camera sensor modules 200 may be included in a control unit which controls the display panel 80.

The display panel 80 can be, for an example, a liquid crystal panel, organic electro luminescence display panel, electrophoresis display panel, or a plasma display panel. If the display panel 80 is the organic electro luminescence display panel or the electrophoresis display panel, the back light unit can be omitted.

The back light unit includes a light source such as fluorescent lamps or LEDs (not shown), an optical filter (not shown) for enhancing light emission efficiency of the light source, a reflective plate (not shown) on an under side of the light source (not shown), and a cover bottom for covering undersides and sides of the light source and the optical filter.

The light source may be a direct lighting type in which a plurality of fluorescent lamps or LEDs are arranged in parallel under the display panel 80, or may be an edge lighting type in which the light source is arranged on a side of the display panel and which has a light plate under the display panel for guiding the light toward the display panel.

The case top 180 can be a frame shape and disposed to enclose the display panel 80 in conformity with a shape of the display panel. The case top 180 may be in the shape of other polygonal shapes as sides are added to the rectangular case top 180 in diagonal directions at the corners. In any case, the case top 180 is formed similar to a picture frame to expose a center portion of the display panel 80.

The retro-reflecting plate 300 includes a retro-reflector layer (not shown), a first adhesive layer (not shown) and a second adhesive layer (not shown) formed on an underside and a top side of the retro-reflector layer (not shown), respectively. The retro-reflecting plate 300 also includes a second optical filer (not shown) on the second adhesive layer.

The retro-reflecting plate 300 is attached to a side of the guide structure adjacent to the infrared camera sensor module 200 at the corner.

The retro-reflector layer a kind of a cube of a cube-corner structure having good efficiency at an incident angle of 0°~65° and may be in a mode of micro prisms formed continuously.

The second optical filter may have a property of transmitting an infrared ray with a wave length of about 700 nm only. The second optical filter may be formed of acryl group resin, such as poly methyl methacrylate (PMMA) or polycarbonate.

Further, the second optical filter may be formed to have a black color with black resin or the like, such that the second optical filter absorbs visible light and transmits infrared rays.

Alternatively, the second optical filter may be formed to have glass composition.

In this instance, the retro-reflecting plate 300 serves to receive the light emitted from the infrared camera sensor module 200 and reflects the received light.

In the meantime, in a display device with the optical sensing frame, the infrared camera sensor modules 200 are arranged at three corners for, in a case of one point touch, sensing a light reflected at the retro-reflecting plate 300 or cutting off of the light from the infrared camera at the touch point by a touch body (input means, such as a hand and a pen) by using two sensors. In a case of a multi touch of two or more than two points, the infrared camera sensor modules 200 are arranged at three corners for sensing an error point which occurs at the time of the touch first by using two adjacent infrared cameras and sensing the multi touch again by using a third infrared camera and an infrared camera adjacent to the third camera to apply a false picture removing algorithm, to perceive the multi touch.

Figure 6A:
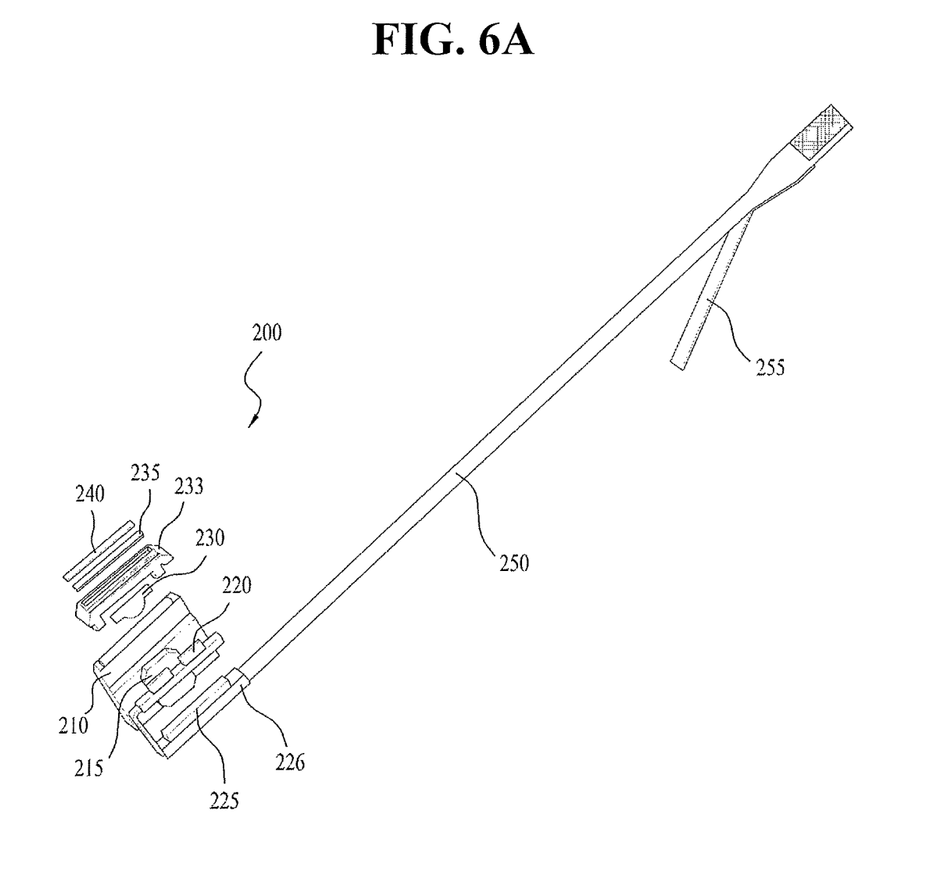
FIG. 6 illustrates a diagram showing a difference of a measured angle and an incident angle when a retro-reflecting plate is positioned at a side of the display panel.
Figure 6B:
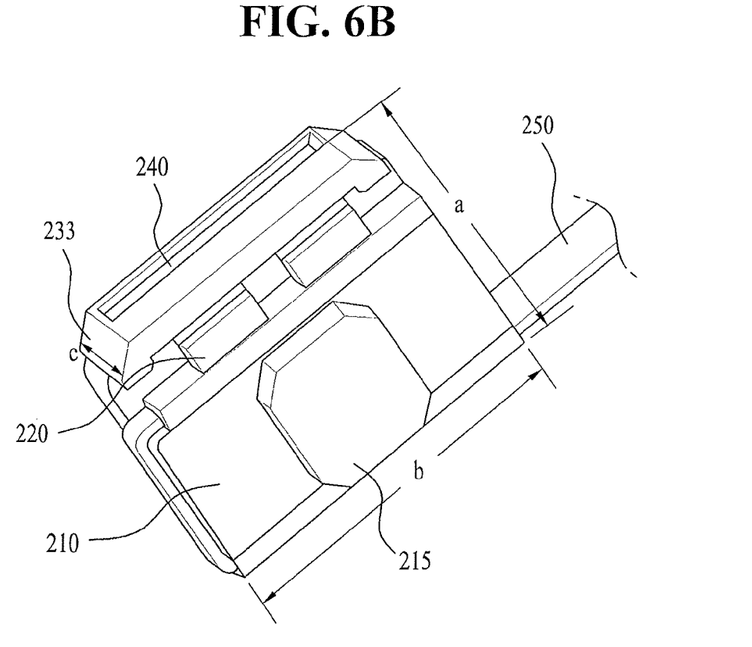
Figure 7:
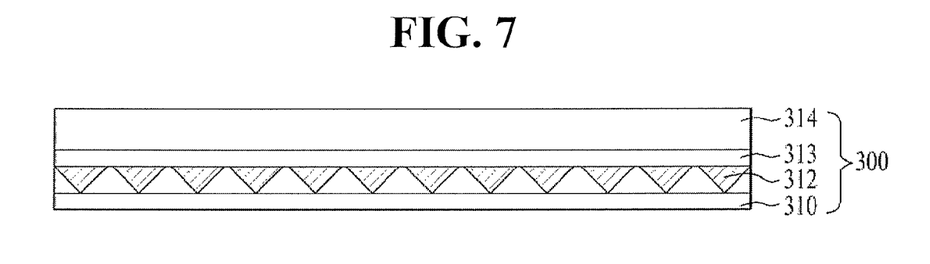
FIG. 7 illustrates a diagram showing reflection efficiency versus an incident angle of a retro-reflecting plate.

FIG. 6 illustrates a diagram showing a difference of a measured angle and an incident angle of each region when the retro-reflecting plates in FIG. 5 are positioned at four sides of the display panel. FIG. 7 illustrates a diagram showing reflection efficiency versus an incident angle of the retro-reflecting plate.

The retro-reflecting plate 300 in FIG. 5 is arranged such that apices of the prisms in the retro-reflecting plate are directed outward with reference to each side of the display panel. In this case, the retro-reflecting plate 300 is formed at a position higher than the display panel 80 at an edge of the display panel.

In this case, referring to FIG. 6, if one of the infrared camera sensor modules 200 is arranged at an upper side of left side of the display panel, with reference to the infrared camera sensor module 200, an upper side and an upper right side corner ①  have an angle of 0, a lower right side corner ③ has an angle of about 29°, and a lower left side corner has an angle of 90°. That is, for an example, if it is assumed that one infrared camera sensor 200 can sense 500 pixels, has an angle of view of about 98° and has a front arranged to face an opposite corner in a diagonal direction with the guide structures 110 arranged on both sides of the infrared camera sensor module, the entire angle of view of 98° does not fall on the display panel, but about 4° in front and rear directions are shaded by the guide structures 110. If the pixels are matched to measured angles, a region of about 19 pixels to about 481 pixels corresponds to the measured angle of 0° to 90°.

In this case, in view of the prism 312 of the retro-reflecting plate 300, even though an incident angle is 0° at the measured angle points of 0° and 90°, at a point of ② for example, the light is incident thereon from the infrared camera sensor 200 not in a perpendicular direction, but in a slant direction. Therefore, the incident angle at point ② is about 10°.

In the meantime, referring to FIG. 7, retro-reflecting efficiency varies with the incident angle, to have the greatest retro-reflecting efficiency when the incident angle is 0° (perpendicular to a bottom surface of the triangular prism of the retro-reflecting plate), and the retro-reflecting efficiency becomes poorer as the incident angle becomes greater than 0°.

Therefore, if the retro-reflecting efficiency is taken into account, the light quantity received is the greatest at the measured angle of 0° and 90° at which the incident angle on the retro-reflecting plate is 0°, and the light quantity received is smaller in regions where the measured angle is between 0° and 90°.

Figure 8:
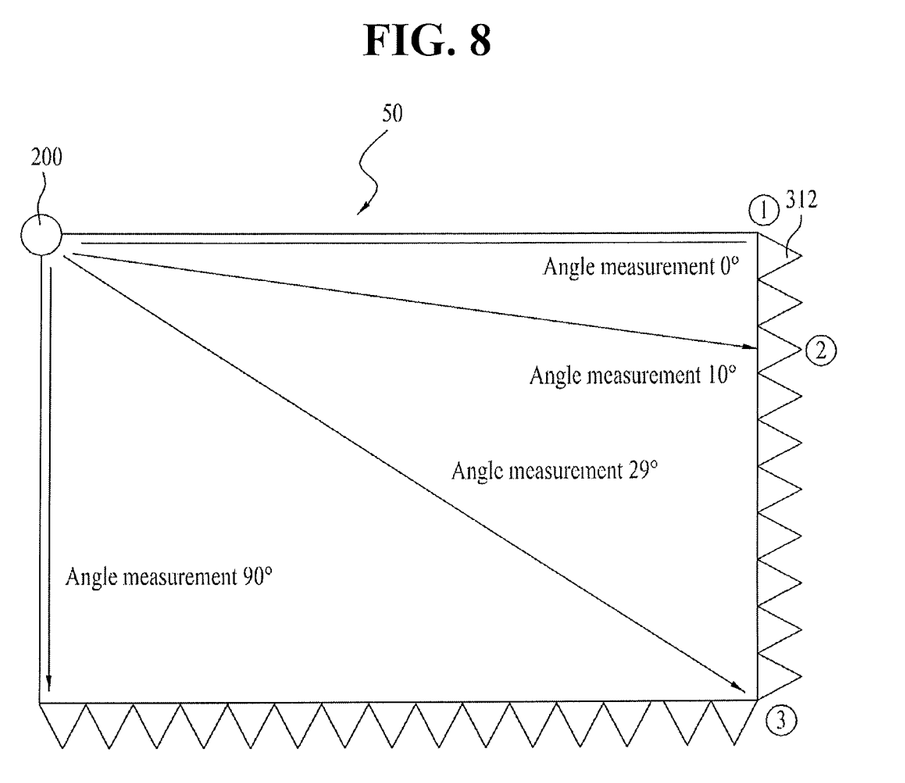
FIG. 8 illustrates a flow chart showing the steps of a method for detecting a touch in accordance with a preferred embodiment of the present disclosure.

FIG. 8 illustrates a flow chart showing the steps of a method for detecting a touch in accordance with a preferred embodiment of the present disclosure.

Referring to FIG. 8, the method for detecting a touch is as follows.

At first, an upper threshold level and a lower threshold level of touch perception of each pixel region are set (S10).

Then, light quantity is sensed at each region by using an infrared camera sensor (S15).

Then, the light quantity sensed is compared with the lower threshold level to determine whether or not the light quantity is smaller than the lower threshold level (S20).

If the sensed light quantity is determined to be smaller than the lower threshold level, it is determined that a touch is made (S30).

Coordinates of the region of which light quantity is determined to be smaller than the lower threshold level are read, to determine a touched point (S40).

If it is determined that the light quantity is not smaller that the lower threshold level in the step S20, then, the light quantity sensed is compared with the upper threshold level to determine whether or not the light quantity sensed is greater than the upper threshold level (S50).

If the light quantity is determined to be greater than the upper threshold level, it is determined that the touch is made (S30). Coordinates of the region of which light quantity is determined to be greater than the upper threshold are read, to determine a touched point (S40).

If it is determined that the light quantity is not greater than the upper threshold level in the step S50, it is determined that no touch is made to the region where the light is sensed.

Thereafter, the steps beginning from S15 is repeated at predetermined time intervals, to determine whether the touch is made to the region or not, and to determine the touched point.

In the meantime, in the display device with a optical sensing frame described above, there are regions at which detection of the touch is difficult due to the presence of continuous great light quantities which are optically similar to each other.

Taking this into account, in the step 10 above, by setting the lower threshold level intentionally higher at a region where a fine touch distinction is optically more difficult, sensitivity of the fine touch distinction can be improved.

Figure 9:
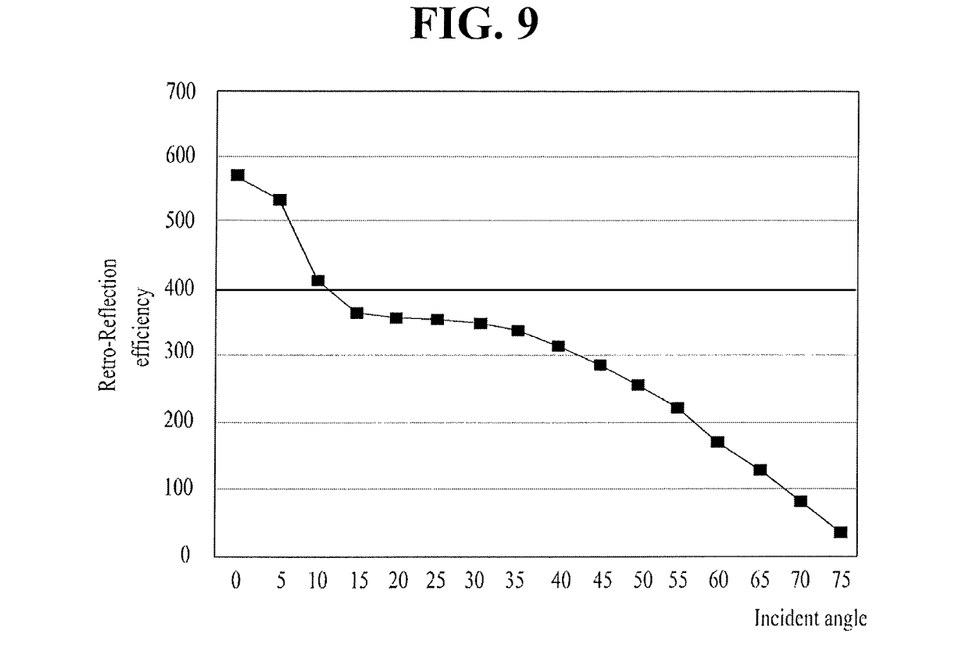
FIG. 9 illustrates a block diagram showing a display panel with an optical sensing frame having the touch detecting method in accordance with a preferred embodiment of the present disclosure.

FIG. 9 illustrates a block diagram showing a display panel with an optical sensing frame having the touch detecting method in accordance with a preferred embodiment of the present disclosure. FIG. 10 illustrates a touch controller of FIG. 9.

As shown in FIG. 9, the touch controller 700 receives sensed light quantity (intensity) from the infrared (IR) camera sensor module 200, detects a touch and calculates the coordinates of the touch. And then, information regarding the detected touch and the coordinates of the touch are transferred to a system 800. The system 800 carries out a touch event based on the transferred information.

The touch controller 700 is connected to each infrared sensor module 200. As shown in FIG. 10, the touch controller 700 comprises a setting part for threshold levels (having upper threshold level and lower threshold level) 710, a comparator 720 for comparing the sensed light quantity and the upper/lower threshold levels and touch calculator 730 for detecting a touch and calculating the coordinates of the touch. The touch calculator 730 transfers the detected touch and the coordinates of the touch to the system 800.

In some cases, the touch controller 700 can be disposed in a control unit of the display panel or disposed independently.

Figure 11:
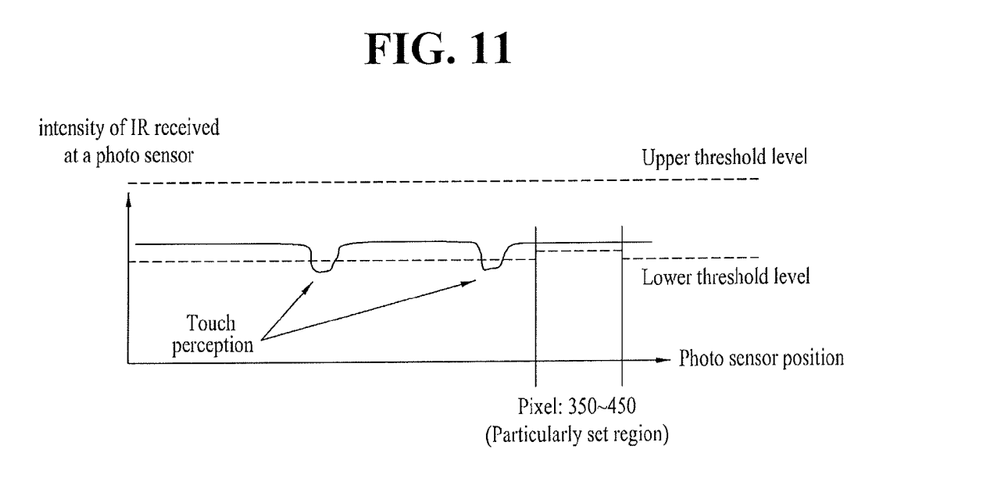
FIG. 11 illustrates a graph showing a method for detecting a touch in accordance with a preferred embodiment of the present disclosure.

FIG. 11 illustrates a graph schematically showing a method for detecting a touch in accordance with a preferred embodiment of the present disclosure.

For an example, referring to FIG. 11, the lower threshold level of the touch perception on the region where a fine touch distinction is more difficult is set to be 90% of the light quantity sensed in a normal state whereas the lower threshold level of the other region ("normal region") is set to be 80% of the light quantity sensed in a normal state.

Although FIG. 11 illustrates that the lower threshold levels of perception of the touch on the normal regions are the same, the lower threshold level and the upper threshold level may vary with different regions if the above schematic view is applied to an actual simulation. The variations in the threshold levels may be due to the differences in the incident angles of the light received from different regions on the retro-reflecting plates, and due to the existence of other infrared cameras or the extents of spacing from other infrared cameras when the infrared cameras and the retro-reflecting plates are actually arranged to the display panel.

Figure 12:
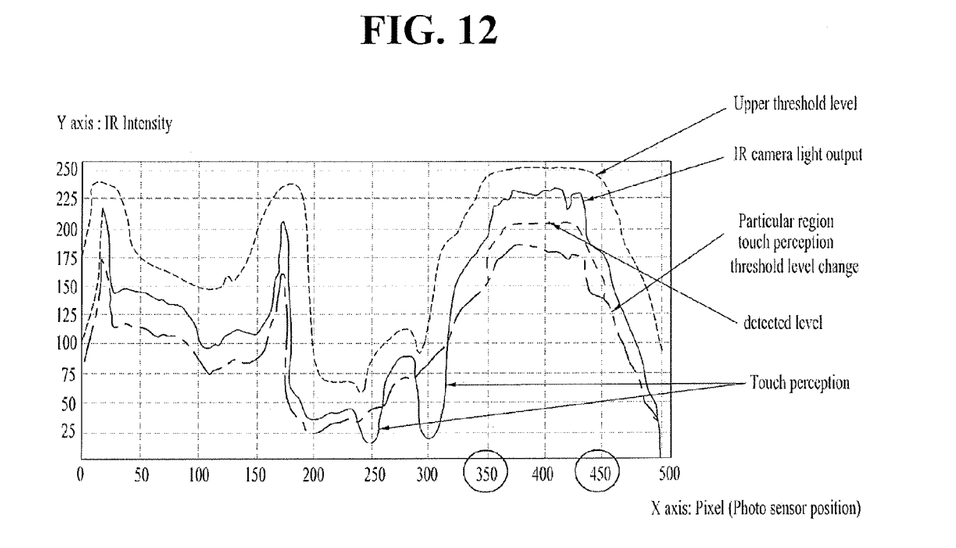
FIG. 12 illustrates a diagram of simulation in which the method for detecting a touch in FIG. 11 is applied to different light quantities of regions on an actual panel.

FIG. 12 illustrates an exemplary diagram of a simulation in which the method for detecting a touch in FIG. 11 is applied to regions having different light quantities on an actual display panel.

As described before, in an actual arrangement of the infrared cameras and the retro-reflecting plates on the display panel, there are differences in the light quantities in a normal state (no touch is made) depending on the difference of the incident angles of the light received from different regions on the retro-reflecting plates. The light quantity may also differ at the normal state depending on the existence of the other infrared camera or on the extents of spacing from the infrared cameras. Taking the above into account, differences of the lower threshold levels and the upper threshold levels may differ from region to region and values may be adjusted at particular regions.

That is, the lower threshold level of perception of the touch may be set to be 0.8 times (80%) of the light quantity in a normal state at regions except the particular region. At the particular region, the quantity of received light increases at the normal state. In this instance, the particular region corresponds to about pixels 350~450 in a photo sensor having a resolution of 500 pixels. For an example, referring to FIG. 4, with regard to the infrared camera sensor at the upper left corner, if the upper right corner is 0° and the lower left corner is 90°, the particular region corresponds to about 60°~87°.

Structurally considering the particular region, in the case of a touch region which is a rectangular shape having a length-to-width ratio of about sixteen to nine (16:9), the particular region comprises a substantially triangular region having a first apex at an optical sensor, a second apex substantially at an end, closer to the optical sensor, of a retro-reflecting plate disposed on a long side of the touch region disposed away from the optical sensor, and a third apex at a point on the retro reflecting plate about three-eighths (3/8) of the length of retro-reflecting plate from the second apex.

The upper threshold level, provided for sensing a touch input made with a material of high reflectivity such as metal or finger nail, is set to be about 1.3 times a normal state light quantity. That is, if the light quantity sensed exceeds the upper threshold level, it is determined that a touch is made. In such case, the touch determined by a light quantity exceeding the upper threshold level is a touch with a reflective material and a material which causes irregular reflection, such as the finger nail or the like.

The lower threshold level is set to be about 0.8 times the light quantity received during a normal state (when no touch is made).

In this instance, the upper threshold level and the lower threshold level are not limited to the multiplication factor 1.3 and 0.8 applied to the normal state light quantity as described above, but may be increased or decreased taking into account the resolution and the sensitivity of the display device with an optical sensing frame intended to be used. For example, to improve the sensitivity, it may be preferred that the upper threshold levels are set within a range of 1.3±0.15 times the light quantity of a normal state.

Moreover, it is preferable that the lower threshold level is adjusted such that a light quantity multiplication factor difference between the particular region and the other region is about 0.1.

For an example, it is preferable that the lower threshold level of the particular region is about 0.9 of the normal state light quantity, and the lower threshold level of the other region (region other than the particular region) is about 0.8 of the normal state light quantity.

Figure 13:
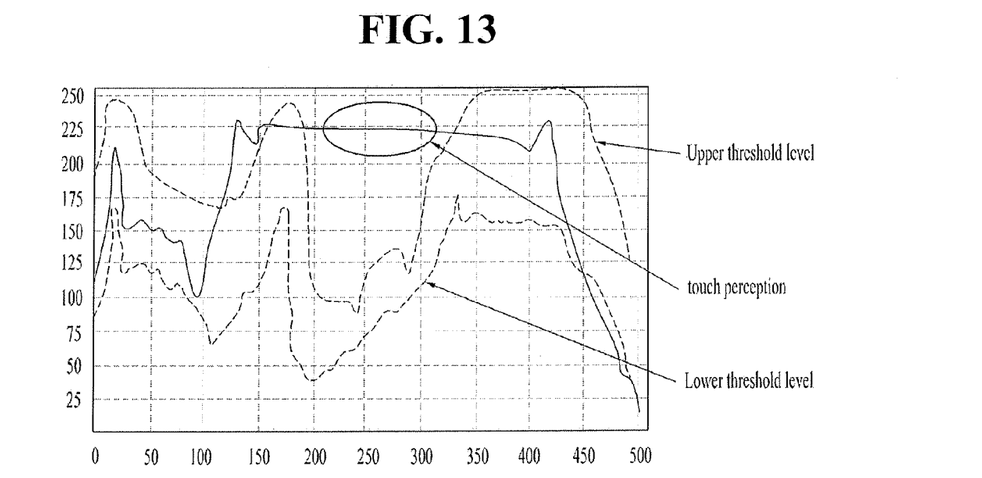
FIG. 13 illustrates a diagram of simulation of a scheme for detecting a touch by a body with surface reflection, like a finger nail, when the method for detecting a touch of the present disclosure is applied.

FIG. 13 illustrates an exemplary diagram of simulation of a scheme for detecting a touch by a body with high surface reflection, such as metal or a finger nail, when the method for detecting a touch of the present disclosure is applied.

Referring to FIG. 13, if a touch is made by an object with a surface with irregular reflective characteristics, such as the finger nail, light quantity received at the infrared camera sensor is increased or saturated sharply. Such light quantity may be compared with the threshold level to determine that the light quantity received is greater than the upper threshold level to perceive the light quantity as the irregular reflection, thereby determining that a touch is made. The position of touch may also be determined.

As described above, in this case, the upper threshold level may be set to be 1.3±0.15 times the normal state light quantity.

Figure 14:
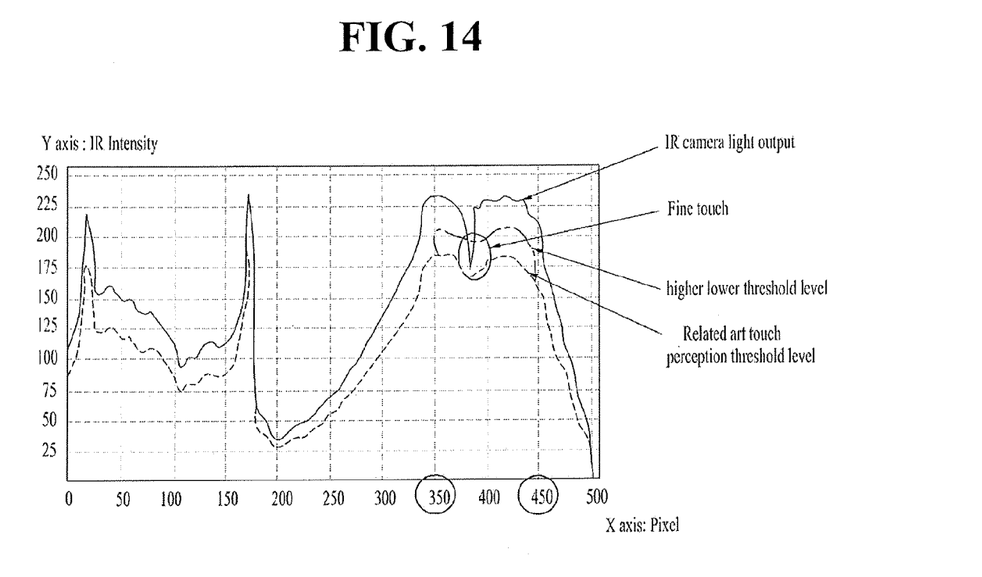
FIG. 14 illustrates a diagram of simulation of a scheme for detecting a fine touch by a thin pen or the like when the method for detecting a touch of the present disclosure is applied.

FIG. 14 illustrates an exemplary diagram of simulation of a scheme for detecting a fine touch, such as making a touch by a thin pen or the like, when the method for detecting a touch of the present disclosure is applied.

FIG. 14 illustrates that the lower threshold level is set higher for regions of about 350 pixels~450 pixels at which the touch perception is weak, particularly, with respect to a fine touch.

Such configuration enhances the resolution of the fine touch and provides a secure and improved touch performance by making the fine touch detectable when a fine touch with thin pen or the like is made. The fine touch may not be easily measured if the threshold level is set to be 0.8 times the normal state light quantity for the entire regions.

According to the present disclosure, the infrared camera sensor may be connected to a control unit of the display panel through an FPC (Flexible Printed Circuit). The control unit includes a touch perception processor having a comparison unit for comparing the light quantity received and detected at the infrared camera sensor, and a predetermined lower threshold level and a predetermined high threshold level.

It will be apparent to those skilled in the art that various modifications and variations can be made in the present disclosure without departing from the spirit or scope of the disclosure. Thus, it is intended that the present disclosure covers the modifications and variations of this disclosure provided they come within the scope of the appended claims and their equivalents.

The invention claimed is:

1. An optical touch sensing method, comprising:
   sensing light corresponding to a touch region of a display panel through an optical sensor module, wherein the optical sensor module includes infrared camera sensors provided to three or more than three corners of the display panel, and retro-reflecting plates formed at four sides of the display panel;
   comparing a first amount of the light sensed corresponding to the touch region with a first lower threshold;
   determining that a touch is made if the first amount is less than or equal to the first lower threshold;
   comparing the first amount of the light sensed corresponding to the touch region with an upper threshold, if the first amount is greater than the first lower threshold;
   determining that a touch is made if the first amount is greater than or equal to the upper threshold;
   sensing light corresponding to a particular touch region;
   comparing a second amount of the light sensed corresponding the particular touch region with a second lower threshold; and
   determining that a touch is made if the second amount is less than or equal to the second lower threshold,
   wherein the second lower threshold is higher than the first lower threshold, and
   wherein the particular touch region comprises a substantially triangular region having a first apex at an optical sensor, a second apex substantially at an end, closer to the optical sensor, of a retro-reflecting plate disposed on a long side of the touch region disposed away from the optical sensor, and a third apex at a point on the retro reflecting plate about three-eighths (3/8) of the length of retro-reflecting plate from the second apex, wherein the touch region is a rectangular shape having a length-to-width ratio of about sixteen to nine (16:9).

2. The method of claim 1, wherein the upper threshold level corresponds to about 115%~145% of reflected light corresponding to the touch region received when no touch is made.

3. The method of claim 1, wherein the first lower threshold level corresponds to about 80% of reflected light corresponding to the touch region received when no touch is made.

4. The method of claim 1, wherein the particular touch region comprises a region corresponding to an angle measurement of about 60°~87°.

5. The method of claim 1, wherein the particular touch region comprises a region corresponding to pixels about 350~450 in an optical sensor having a one-dimensional resolution of 500 pixels.

6. The method of claim 1, the second lower threshold corresponds to about 90% of the light sensed corresponding to the particular touch region received when no touch is made.

7. An optical touch sensing system, comprising:
   an optical sensor module operable to sense light corresponding to a touch region of a display panel, wherein the optical sensor module includes infrared camera sensors provided to three or more than three corners of the display panel, and retro-reflecting plates formed at four sides of the display panel; and
   a control unit coupled to the optical sensor module operable to:
   compare a first amount of the light sensed corresponding to the touch region with a first lower threshold,
   determine that a touch is made if the first amount is less than or equal to the first lower threshold,
   compare the first amount of the light sensed corresponding to the touch region with an upper threshold, if the first amount is greater than the first lower threshold, and
   determine that a touch is made if the first amount is greater than or equal to the upper threshold;
   wherein:
   the optical sensing module is further operable to sense light corresponding to a particular touch region; and
   the control unit is further operable to:
   compare a second amount of the light sensed corresponding the particular touch region with a second lower threshold, and
   determine that a touch is made if the second amount is less than or equal to the second lower threshold,
   wherein the second lower threshold is higher than the first lower threshold, and
   wherein the particular touch region comprises a substantially triangular region having a first apex at an optical sensor of the optical sensor module, a second apex substantially at an end closer to the optical sensor of a retro-reflecting plate disposed on a long side of the touch region disposed away from the optical sensor, and a third apex at a point on the retro reflecting plate about three-eighths (3/8) of the length of retro-reflecting plate from the second apex, wherein the touch region is a substantially rectangular shape having a length-to-width ratio of about sixteen to nine (16:9).

8. The optical touch sensing system of claim 7, wherein the upper threshold level corresponds to about 115%~145% of reflected light corresponding to the touch region received when no touch is made.

9. The optical touch sensing system of claim 7, wherein the first lower threshold level corresponds to about 80% of reflected light corresponding to the touch region received when no touch is made.

10. The optical touch sensing system of claim 7, wherein the particular touch region comprises a region corresponding to an angle measurement of about 60°~87°.

11. The optical touch sensing system of claim 7, wherein the particular touch region comprises a region corresponding to pixels about 350~450 in an optical sensor having a one-dimensional resolution of 500 pixels.

12. The optical touch sensing system of claim 7, wherein the second lower threshold corresponds to about 90% of the light sensed corresponding to the particular touch region received when no touch is made.

* * * * *